United States Patent
Brust et al.

(10) Patent No.: US 8,940,821 B2
(45) Date of Patent: Jan. 27, 2015

(54) INKS FOR HIGH SPEED DURABLE INKJET PRINTING

(75) Inventors: Thomas B. Brust, Webster, NY (US); Paul D. Yacobucci, Rochester, NY (US); Yongcai Wang, Webster, NY (US); Catherine A. Falkner, Rochester, NY (US); Thanhchau T. Nguyen, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 1542 days.

(21) Appl. No.: 12/234,753

(22) Filed: Sep. 22, 2008

(65) Prior Publication Data

US 2009/0169749 A1 Jul. 2, 2009

Related U.S. Application Data

(60) Provisional application No. 61/016,991, filed on Dec. 27, 2007.

(51) Int. Cl.
| | | |
|---|---|---|
| *B05D 5/06* | (2006.01) | |
| *C08G 18/48* | (2006.01) | |
| *C08G 18/08* | (2006.01) | |
| *C08G 18/50* | (2006.01) | |
| *C09D 11/322* | (2014.01) | |
| *C09D 11/40* | (2014.01) | |
| *C09D 175/08* | (2006.01) | |

(52) U.S. Cl.
CPC ........ *C08G 18/4854* (2013.01); *C08G 18/0823* (2013.01); *C08G 18/482* (2013.01); *C08G 18/5024* (2013.01); *C09D 11/322* (2013.01); *C09D 11/40* (2013.01); *C09D 175/08* (2013.01)
USPC ........................................................ 524/160

(58) Field of Classification Search
USPC ................ 523/160, 161; 106/32.85; 427/258; 524/589, 590, 591
See application file for complete search history.

(56) References Cited

U.S. PATENT DOCUMENTS

| | | | |
|---|---|---|---|
| 6,794,425 B1 | 9/2004 | Ellis et al. | |
| 2002/0186278 A1* | 12/2002 | Nakamura et al. | ............. 347/46 |
| 2003/0166742 A1 | 9/2003 | Hirasa et al. | |
| 2004/0085419 A1* | 5/2004 | Yau et al. | ...................... 347/100 |
| 2006/0023044 A1* | 2/2006 | Bauer | ........................ 347/100 |
| 2008/0207811 A1* | 8/2008 | Brust et al. | ................... 524/401 |

FOREIGN PATENT DOCUMENTS

| | | |
|---|---|---|
| EP | 1 743 911 | 1/2007 |
| WO | WO 03/006561 | 1/2003 |
| WO | WO 03/010250 | 2/2003 |
| WO | WO 03/046039 | 6/2003 |
| WO | WO 2008/106147 | 9/2008 |

OTHER PUBLICATIONS

Jeffamine Polyetheramine Products Overview, Huntsman International LLC, May 2007.*

* cited by examiner

Primary Examiner — Richard A Huhn
(74) Attorney, Agent, or Firm — Andrew J. Anderson

(57) ABSTRACT

An inkjet ink composition comprising water, and at least one water-dispersible polyurethane/urea polymer having at least a first soft segment formed from a polyol prepolymer and at least a second soft segment formed from a polyamine prepolymer, wherein the polyol prepolymer forms urethane bonds in the polyurethane/urea and the polyamine prepolymer forms urea bonds in the polyurethane/urea, and further wherein at least about 4% by weight of the combined soft segments is formed by polyamine prepolymers that form urea bonds in the polyurethane/urea polymer.

14 Claims, No Drawings

INKS FOR HIGH SPEED DURABLE INKJET PRINTING

CROSS-REFERENCE TO RELATED APPLICATIONS

This is a 111A application of Provisional Application Ser. No. 61/016,991, filed Dec. 27, 2007.

FIELD OF THE INVENTION

The invention relates generally to the field of recording inks for inkjet printing, and in particular to inks which are useful for thermal inkjet printing. More specifically, the invention relates to inks formulated with polyurethane/urea binders for high-speed thermal inkjet printing which exhibit excellent jetting latency and which result in high quality images when printed to an inkjet receiver.

BACKGROUND OF THE INVENTION

Inkjet printing is a non-impact method for producing printed images by the deposition of ink droplets in a pixel-by-pixel manner to an image-recording element in response to digital signals. There are various methods that may be utilized to control the deposition of ink droplets on the image-recording element to yield the desired printed image. In one process, known as drop-on-demand inkjet, individual droplets are projected as needed onto the image-recording element to form the desired printed image. Common methods of controlling the ejection of ink droplets in drop-on-demand printing include thermal bubble formation (thermal inkjet (TIJ)) and piezoelectric transducers. In another process known as continuous inkjet (CIJ), a continuous stream of droplets is generated and expelled in an image-wise manner onto the surface of the image-recording element, while non-imaged droplets are deflected, caught, and recycled to an ink sump. Inkjet printers have found broad applications across markets ranging from desktop document and photographic-quality imaging, to short run printing and industrial labeling.

Ink compositions containing colorants used in inkjet printers can be classified as either pigment-based, in which the colorant exists as pigment particles suspended in the ink composition, or as dye-based, in which the colorant exists as a fully solvated dye species that consists of one or more dye molecules. Pigments are highly desirable since they are far more resistant to fading than dyes. However, pigment inks can have inferior durability after printing, especially under conditions where abrasive forces have been applied to the printed image and especially at short time intervals from immediately after printing to several minutes while the inks are drying. Furthermore, colorless inks are also known in the art of inkjet printing and can be used to impart additional durability or to modify the image quality of the resulting printed image. Common approaches to improving durability of pigment-based inks or colorless inks include the addition of polymeric binders as one of the ink components.

Whether an ink is colorless, dye-based, or pigment-based, the ink must be ejected from a printhead, reliably for numerous individual firing events during the lifetime of a printer. As an example, a typical inkjet nozzle may be required to fire in excess of $5 \times 10^7$ and up to as many as $1 \times 10^9$ individual firing events without malfunctioning or ceasing to fire altogether. This includes situations where the printhead is left idle or uncapped for long periods of time and then is actuated again to eject ink. In some instances the idle printhead nozzles can partially clog or crust with ink components thereby degrading the ability of the printhead to eject properly. For example, the ink can be misdirected from the partially clogged nozzles or the drop velocity can be greatly diminished. In some instances, the nozzle will become permanently clogged and in other instances a lengthy and costly maintenance operation may be required to recover the nozzle back to a usable state of operation. This phenomenon is known in the art of inkjet printing as latency or de-cap.

One measurement of latency performance involves measuring the initial drop velocity of an ink that is firing at a useful steady state condition followed by the measurement of the drop velocity after some time interval during which the nozzle is idle, uncapped, and exposed to ambient conditions. The drop velocity after the latency interval can vary depending on how many ejection pulses are applied to recover the nozzle back to a useful drop velocity. An ink having good latency performance would exhibit a useful drop velocity after long de-cap intervals with a minimum number of ejection pulses. Therefore, a longer latency is highly desirable as the ink can reside in the idle printhead for a longer time without adversely affecting the ink ejection performance.

Inks formulated with polymeric binders can be difficult to jet through inkjet printheads having small nozzle diameters especially by the thermal inkjet printing process. This is especially true of pigment-based inks, which require polymeric binders in order to achieve reasonable durability in the printed images. In recent years, thermal inkjet printers have moved to higher jetting frequencies to provide faster printing speeds. Thermal inkjet printers are now capable of printing at jetting frequencies in excess of 10 kHz and the ability for higher velocity firings is a highly desirable feature. However, this high frequency firing often comes at the cost of variability in the drop velocity, which leads to poor image quality in the final printed image.

Polyurethane binders have been used as durability enhancing additives in dye-based and pigment-based inkjet inks. U.S. Pat. No. 6,136,890 discloses a pigment-based inkjet ink wherein the pigment particles are stabilized by a polyurethane dispersant. US Publication No. 2004/0242726 discloses a pigment dispersed by a cross-linking step between a resin having a urethane bond and a second water-soluble polymer. US Publication No. 2004/0229976 discloses polyurethane/polyurea resins for pigmented inks where the weight fraction of a polyurethane urea part is at most 2.0 wt % to the urethane resin.

Although polyurethanes are known for their excellent durability, they also have a number of drawbacks. For example, not all polyurethane polymers are conducive to jetting from a thermal inkjet head. In particular, water-dispersible polyurethane particles, such as those disclosed in U.S. Pat. Nos. 6,533,408; 6,268,101; Statutory Invention Registration No. U.S. H2113H; and US Publication Numbers 2004/0130608 and 2004/0229976 are particularly difficult to jet from a thermal inkjet printhead at high firing frequencies. The molecular weight of the polyurethane binder plays an important role in the ink performance and durability of the resulting printed images. For example, molecular weights below about 8,000 generally do not provide highly durable images. On the other hand, molecular weights above about 50,000, and especially above 150,000, can raise the viscosity of the ink, which can be detrimental to firing performance from a thermal inkjet printhead. The acid number of the polyurethane also creates limitations for use in an inkjet printing system. If the acid number of the polyurethane is too high the resulting abrasion resistance of the image can become degraded, especially under conditions of high temperature and high humidity. If the acid number of the polyurethane is too low a substantial amount of particulate polymer will exist and jetting can become degraded.

It is also known in the art of pigment-based inkjet inks to combine a polyurethane with a second polymer, such as an acrylic polymer or polyester. U.S. Pat. No. 6,794,425 discloses a mixture of a hydrophilic polyurethane and a hydrophobic polymer where the molecular weights of polymers are specified. US Publication No. 2003/0166742 discloses the combination of a polyurethane and a second polymer where the acid numbers of the polymers are specified. However, such ink formulations can exhibit short latency times in those inkjet printheads.

PROBLEM TO BE SOLVED BY THE INVENTION

Although the use of polyurethane binders have found use in inkjet printers, there remains the need to provide inkjet inks that are, simultaneously, capable of providing durable images, have a minimal impact on ink viscosity, and which extend the latency performance without degrading high frequency printing performance. It is therefore an object of this invention to provide an inkjet ink, and an ink set including two or more colored or colorless inks for inkjet printing whereby each of the inks contain a polyurethane binder which jet from a thermal inkjet printhead at high frequency and with low velocity variability and which provide extended latency performance. It is a further objective of the present invention to provide colored ink compositions containing a polyurethane binder which provides excellent image quality and maintains durability when printed to an inkjet receiver.

SUMMARY OF THE INVENTION

In accordance with one embodiment, the invention is directed towards an inkjet ink composition comprising:
(A) water, and
(B) at least one water-dispersible polyurethane/urea polymer having at least a first soft segment formed from a polyol prepolymer and at least a second soft segment formed from a polyamine prepolymer, wherein the polyol prepolymer forms urethane bonds in the polyurethane/urea and the polyamine prepolymer forms urea bonds in the polyurethane/urea, and further wherein at least about 4% by weight of the combined soft segments is formed by polyamine prepolymers that form urea bonds in the polyurethane/urea polymer.

DETAILED DESCRIPTION OF THE INVENTION

The inkjet inks of the present invention are aqueous-based inks. "Aqueous-based" is defined herein as ink comprising mainly water as the carrier medium for the remaining ink components. In a preferred embodiment, the inks of the present invention comprise at least about 50 weight percent water. Pigment-based inks are defined as inks containing at least a dispersion of water-insoluble pigment particles. Dye-based inks are defined as inks containing at least a colored dye, which is soluble in the aqueous carrier. Colorless inks are defined as inks which are substantially free of colorants such as dyes or pigments and as such are not intended to contribute to color formation in the image forming process.

An ink set is defined as a set of two or more inks. The ink sets may contain inks of different colors, for example, cyan, magenta, yellow, red, green, blue, orange, violet, or black. In one embodiment, a carbon black pigmented ink is used in an ink set comprising at least three inks having separately, a cyan, a magenta, and a yellow colorant. Useful ink sets also include, in addition to the cyan, magenta and yellow inks, complimentary colorants such as red, blue, violet, orange, or green inks. In addition, the ink set may comprise light and dark colored inks, for example, light cyan and light magenta inks commonly used in the ink sets of wide format printers. It is possible to include one or more inks that comprise a mixture of different colorants in the ink set. An example of this is a carbon black pigment mixed with one or more colored pigments or a combination of different colored dyes in the same ink. An ink set may also include one or more colored inks in combination with one or more colorless inks. An ink set may also include at least one or more pigment-based inks in combination with additional inks that are dye-based ink.

Pigment-based inks useful in the present invention can comprise pigment particles dispersed in the aqueous carrier. The pigment particles that are useful in the invention may be prepared by any method known in the art of inkjet printing. Useful methods commonly involve two steps: (a) a dispersing or milling step to break up the pigments to primary particles, where primary particle is defined as the smallest identifiable subdivision in a particulate system; and (b) a dilution step in which the pigment dispersion from step (a) is diluted with the remaining ink components to give a working strength ink.

The milling step (a) is carried out using any type of grinding mill such as a media mill, ball mill, two-roll mill, three-roll mill, bead mill, and air-jet mill; an attritor; or a liquid interaction chamber. In the milling step (a), pigments are optionally suspended in a medium that is typically the same as or similar to the medium used to dilute the pigment dispersion in step (b). Inert milling media are optionally present in the milling step (a) in order to facilitate break up of the pigments to primary particles. Inert milling media include such materials as polymeric beads, glasses, ceramics, metals, and plastics as described, for example, in U.S. Pat. No. 5,891,231. Milling media are removed from either the pigment dispersion obtained in step (a) or from the ink composition obtained in step (b).

A dispersant is optionally present in the milling step (a) in order to facilitate break up of the pigments into primary particles. For the pigment dispersion obtained in step (a) or the ink composition obtained in step (b), a dispersant is optionally present in order to maintain particle stability and prevent settling. Dispersants suitable for use in the invention include, but are not limited to, those commonly used in the art of inkjet printing. For aqueous pigment-based ink compositions, useful dispersants include anionic, cationic or nonionic surfactants such as sodium dodecylsulfate, or potassium or sodium oleylmethyltaurate as described in, for example, U.S. Pat. Nos. 5,679,138; 5,651,813; or 5,985,017.

Polymeric dispersants are also known and useful in aqueous pigment-based ink compositions. Polymeric dispersants may be added to the pigment dispersion prior to, or during the milling step (a), and include polymers such as homopolymers and copolymers; anionic, cationic, or nonionic polymers; or random, block, branched, or graft polymers. Polymeric dispersants useful in the milling operation include random and block copolymers having hydrophilic and hydrophobic portions; see for example, U.S. Pat. Nos. 4,597,794; 5,085,698; 5,519,085; 5,272,201; 5,172,133; 6,043,297; and WO 2004/111140A1; and graft copolymers; see for example, U.S. Pat. Nos. 5,231,131; 6,087,416; 5,719,204; or 5,714,538.

Typically, these polymeric resins are copolymers made from hydrophobic and hydrophilic monomers. In this case, the copolymers are designed to act as dispersants for the pigment by virtue of the arrangement and proportions of hydrophobic and hydrophilic monomers. The pigment particles are colloidally stabilized by the dispersant and are referred to as a polymer dispersed pigment dispersion. The pigment dispersions useful in pigment-based ink compositions desirably have a median particle diameter of less than 200 nm and more preferably less than 100 nm.

Polymeric dispersants (copolymers) for the pigment are not limited in the arrangement of the monomers comprising the copolymer. The arrangement of monomers may be totally random, or they may be arranged in blocks such as AB or ABA wherein, A is the hydrophobic monomer and B is the hydrophilic monomer. In addition, the polymer may take the form of a random terpolymer or an ABC tri-block wherein, at least one of the A, B, and C blocks is chosen to be the hydrophilic monomer and the remaining blocks are hydrophobic blocks dissimilar from one another.

Especially useful copolymer dispersants are those where the hydrophobic monomer is selected from benzyl methacrylate or acrylate, or from methacrylic or acrylic acid esters containing an aliphatic chain having twelve or more carbons, which aliphatic chains may be linear or branched. Examples of methacrylic and acrylic acid esters having twelve or more carbons in an aliphatic chain include; lauryl acrylate, lauryl methacrylate, tridecyl acrylate, tridecyl methacrylate, tetradecyl acrylate, tetradecyl methacrylate, cetyl acrylate, isocetyl acrylate, stearyl methacrylate, iso-stearyl methacrylate, stearyl acrylate, stearyl methacrylate, decyltetradecyl acrylate, decyltetradecyl methacrylate, and the like. Preferably the methacrylate or acrylate monomer is stearyl or lauryl methacrylate or acrylate. The hydrophobic portion of the polymer may be prepared from one or more of the hydrophobic monomers.

Preferred copolymer dispersants are those where the hydrophilic monomer is selected from carboxylated monomers. Preferred polymeric dispersants are copolymers prepared from at least one hydrophilic monomer that is an acrylic acid or methacrylic acid monomer, or combinations thereof. Preferably, the hydrophilic monomer is methacrylic acid.

Typically, the weight average molecular weight of the copolymer dispersant has an upper limit such that it is less than about 50,000 Daltons. Desirably the weight average molecular weight of the copolymer is less than about 25,000 Daltons; more preferably it is less than 15,000 and most preferably less than 10,000 Daltons. The molecular weight of the copolymer has a weight average molecular weight lower limit such that it is greater than about 500 Daltons.

In one preferred embodiment the copolymer dispersants are those wherein the hydrophobic monomer is benzyl methacrylate and is present from 50 weight percent to 80 weight percent relative to the total weight of the polymeric dispersant and the hydrophilic monomer is methacrylic acid.

In a second preferred embodiment the copolymer dispersants comprise a hydrophobic monomer having a carbon chain length of greater than or equal to 12 carbons present in an amount of at least 10% by weight of the total copolymer, and more preferably greater than 20% by weight, an optional additional hydrophobic monomer comprising an aromatic group, and the hydrophilic monomer is methacrylic acid. For example, the additional aromatic group containing monomer may be benzyl acrylate or benzyl methacrylate. A preferred additional monomer is benzyl methacrylate.

The total amount of hydrophobic monomers, comprising the monomer having a chain with greater than or equal to 12 carbons and optionally, a monomer containing an aromatic group, are present in the polymer in an amount of 20 to 95% by weight of the total polymer. The hydrophobic aromatic-group containing monomer may be present in an amount from about 0 to 85% by weight of the total polymer, more preferably from about 0 to 60%, and most preferably from about 0 to 50%. A particularly preferred embodiment is a terpolymer of benzyl methacrylate, stearyl methacrylate, and methacrylic acid.

Particularly useful polymeric pigment dispersants are further described in US Publication Numbers 2006/0012654 and 2007/0043144, the disclosures of which are incorporated herein by reference.

Encapsulating-type polymeric dispersants and polymeric dispersed pigments thereof can also be used in the invention. Specific examples are described in U.S. Pat. Nos. 6,723,785 and 6,852,777; and US Publication Numbers 2004/0132942; 2005/0020731; 2005/0009951; 2005/0075416; 2005/0124726; 2004/0077749; and 2005/0124728; the disclosures of which are incorporated by reference. Encapsulating-type polymeric dispersants can be especially useful because of their high dispersion stability upon keeping and the low degree of interaction with ink components. Composite colorant particles having a colorant phase and a polymer phase are also useful in aqueous inks of the invention. Composite colorant particles are formed by polymerizing monomers in the presence of pigments; see for example, US Publication Numbers 2003/0199614; 2003/0203988; or 2004/0127639. Microencapsulated-type pigment particles are also useful and consist of pigment particles coated with a resin film; see for example U.S. Pat. No. 6,074,467.

Pigments suitable for use in the invention include, but are not limited to, azo pigments, monoazo pigments, disazo pigments, azo pigment lakes, β-Naphthol pigments, Naphthol AS pigments, benzimidazolone pigments, disazo condensation pigments, metal complex pigments, isoindolinone and isoindoline pigments, polycyclic pigments, phthalocyanine pigments, quinacridone pigments, perylene and perinone pigments, thioindigo pigments, anthrapyrimidone pigments, flavanthrone pigments, anthanthrone pigments, dioxazine pigments, triarylcarbonium pigments, quinophthalone pigments, diketopyrrolo pyrrole pigments, titanium oxide, iron oxide, and carbon black.

Typical examples of pigments that may be used include Color Index (C. I.) Pigment Yellow 1, 2, 3, 5, 6, 10, 12, 13, 14, 16, 17, 62, 65, 73, 74, 75, 81, 83, 87, 90, 93, 94, 95, 97, 98, 99, 100, 101, 104, 106, 108, 109, 110, 111, 113, 114, 116, 117, 120, 121, 123, 124, 126, 127, 128, 129, 130, 133, 136, 138, 139, 147, 148, 150, 151, 152, 153, 154, 155, 165, 166, 167, 168, 169, 170, 171, 172, 173, 174, 175, 176, 177, 179, 180, 181, 182, 183, 184, 185, 187, 188, 190, 191, 192, 193, 194; C. I. Pigment Red 1, 2, 3, 4, 5, 6, 7, 8, 9, 10, 11, 12, 13, 14, 15, 16, 17, 18, 21, 22, 23, 31, 32, 38, 48:1, 48:2, 48:3, 48:4, 49:1, 49:2, 49:3, 50:1, 51, 52:1, 52:2, 53:1, 57:1, 60:1, 63:1, 66, 67, 68, 81, 95, 112, 114, 119, 122, 136, 144, 146, 147, 148, 149, 150, 151, 164, 166, 168, 169, 170, 171, 172, 175, 176, 177, 178, 179, 181, 184, 185, 187, 188, 190, 192, 194, 200, 202, 204, 206, 207, 210, 211, 212, 213, 214, 216, 220, 222, 237, 238, 239, 240, 242, 243, 245, 247, 248, 251, 252, 253, 254, 255, 256, 258, 261, 264; C.I. Pigment Blue 1, 2, 9, 10, 14, 15:1, 15:2, 15:3, 15:4, 15:6, 15, 16, 18, 19, 24:1, 25, 56, 60, 61, 62, 63, 64, 66, bridged aluminum phthalocyanine pigments; C.I. Pigment Black 1, 7, 20, 31, 32; C. I. Pigment Orange 1, 2, 5, 6, 13, 15, 16, 17, 17:1, 19, 22, 24, 31, 34, 36, 38, 40, 43, 44, 46, 48, 49, 51, 59, 60, 61, 62, 64, 65, 66, 67, 68, 69; C.I. Pigment Green 1, 2, 4, 7, 8, 10, 36, 45; C.I. Pigment Violet 1, 2, 3, 5:1, 13, 19, 23, 25, 27, 29, 31, 32, 37, 39, 42, 44, 50; or C.I. Pigment Brown 1, 5, 22, 23, 25, 38, 41, 42.

The pigment particles useful in the present invention are dispersed by a dispersant in an amount sufficient to provide stability in the aqueous suspension and subsequent ink. The amount of dispersant relative to pigment is a function of the desired particle size and related surface area of the fine particle dispersion. The weight ratio of pigment to dispersant can range from about 10:1 to about 1:1, and more preferably from about 5:1 to about 2:1. It is understood that the amount of polymer and relative ratios of the monomer constituents can be varied to achieve the desired particle stability and ink firing performance for a given pigment, as it is known that pigments can vary in composition and affinity for the dispersant.

The inks of the invention may also optionally comprise self-dispersing pigments that are dispersible without the use of a dispersant. Pigments of this type are those that have been subjected to a surface treatment such as oxidation/reduction, acid/base treatment, or functionalization through coupling chemistry. The surface treatment can render the surface of the pigment with anionic, cationic, or non-ionic groups. Examples of self-dispersing type pigments include, but are not limited to, CAB-O-JET® 200 and CAB-O-JET® 300 (Cabot Corp.) and BONJET® Black CW-1, CW-2, and CW-3 (Orient Chemical Industries, Ltd.).

Dyes suitable for use in the invention include, but are not limited to, those commonly used in the art of inkjet printing. For aqueous-based ink compositions, such dyes include water-soluble reactive dyes, direct dyes, anionic dyes, cationic dyes, acid dyes, food dyes, metal-complex dyes, phthalocyanine dyes, anthraquinone dyes, anthrapyridone dyes, azo dyes, rhodamine dyes, solvent dyes, and the like. Specific examples of dyes usable in the present invention are as follows; yellow dyes including: C.I. Acid Yellow 1, 3, 11, 17, 19, 23, 25, 29, 36, 38, 40, 42, 44, 49, 59, 61, 70, 72, 75, 76, 78, 79, 98, 99, 110, 111, 127, 131, 135, 142, 162, 164, and 165; C.I. Direct Yellow 1, 8, 11, 12, 24, 26, 27, 33, 39, 44, 50, 58, 85, 86, 87, 88, 89, 98, 110, 132, 142, and 144; C.I. Reactive Yellow 1, 2, 3, 4, 6, 7, 11, 12, 13, 14, 15, 16, 17, 18, 22, 23, 24, 25, 26, 27, 37, and 42; and C.I. Food Yellow 3 and 4; magenta dyes including: C.I. Acid Red 1, 6, 8, 9, 13, 14, 18, 26, 27, 32, 35, 37, 42, 51, 52, 57, 75, 77, 80, 82, 85, 87, 88, 89, 92, 94, 97, 106, 111, 114, 115, 117, 118, 119, 129, 130, 131, 133, 134, 138, 143, 145, 154, 155, 158, 168, 180, 183, 184, 186, 194, 198, 209, 211, 215, 219, 249, 252, 254, 262, 265, 274, 282, 289, 303, 317, 320, 321, and 322; C.I. Direct Red 1, 2, 4, 9, 11, 13, 17, 20, 23, 24, 28, 31, 33, 37, 39, 44, 46, 62, 63, 75, 79, 80, 81, 83, 84, 89, 95, 99, 113, 197, 201, 218, 220, 224, 225, 226, 227, 228, 229, 230, and 231; C.I. Reactive Red 1, 2, 3, 4, 5, 6, 7, 8, 11, 12, 13, 15, 16, 17, 19, 20, 21, 22, 23, 24, 28, 29, 31, 32, 33, 34, 35, 36, 37, 38, 39, 40, 41, 42, 43, 45, 46, 49, 50, 58, 59, 63, and 64; and C.I. Food Red 7, 9, and 14; cyan dyes including; C.I. Acid Blue 1, 7, 9, 15, 22, 23, 25, 27, 29, 40, 41, 43, 45, 54, 59, 60, 62, 72, 74, 78, 80, 82, 83, 90, 92, 93, 100, 102, 103, 104, 112, 113, 117, 120, 126, 127, 129, 130, 131, 138, 140, 142, 143, 151, 154, 158, 161, 166, 167, 168, 170, 171, 182, 183, 184, 187, 192, 199, 203, 204, 205, 229, 234, 236, and 249; C.I. Direct Blue 1, 2, 6, 15, 22, 25, 41, 71, 76, 77, 78, 80, 86, 87, 90, 98, 106, 108, 120, 123, 158, 160, 163, 165, 168, 192, 193, 194, 195, 196, 199, 200, 201, 202, 203, 207, 225, 226, 236, 237, 246, 248, and 249; C.I. Reactive Blue 1, 2, 3, 4, 5, 7, 8, 9, 13, 14, 15, 17, 18, 19, 20, 21, 25, 26, 27, 28, 29, 31, 32, 33, 34, 37, 38, 39, 40, 41, 43, 44, and 46; and C. I. Food Blue 1 and 2; black dyes including: C.I. Acid Black 1, 2, 7, 24, 26, 29, 31, 48, 50, 51, 52, 58, 60, 62, 63, 64, 67, 72, 76, 77, 94, 107, 108, 109, 110, 112, 115, 118, 119, 121, 122, 131, 132, 139, 140, 155, 156, 157, 158, 159, and 191; C.I. Direct Black 17, 19, 22, 32, 39, 51, 56, 62, 71, 74, 75, 77, 94, 105, 106, 107, 108, 112, 113, 117, 118, 132, 133, 146, 154, and 168; C.I. Reactive Black 1, 3, 4, 5, 6, 8, 9, 10, 12, 13, 14, 31, and 18; and C.I. Food Black 2, CAS No. 224628-70-0 sold as JPD Magenta EK-1 Liquid from Nippon Kayaku Kabushiki Kaisha; CAS No. 153204-88-7 sold as INTRAJET® Magenta KRP from Crompton and Knowles Colors; and the metal azo dyes disclosed in U.S. Pat. Nos. 5,997,622 and 6,001,161.

Also useful in the invention are polymeric dyes or loaded-dye/latex particles. Examples of polymeric dyes are described in U.S. Pat. No. 6,457,822 and references therein. Examples of loaded-dye/latex particles are described in U.S. Pat. No. 6,431,700; US Publication Numbers 2004/0186199, 2004/0186198, 2004/0068029, 2003/0119984, and 2003/0119938.

The colorants used in the ink composition of the invention may be present in any effective amount, generally from 0.1 to 10% by weight, and preferably from 0.5 to 6% by weight, more preferably from 1 to 4% by weight.

Ink compositions useful in the invention can also comprise a humectant in order to achieve high frequency firing with low variability. Representative examples of humectants which may be employed in the present invention include: (1) triols, such as glycerol, 1,2,6-hexanetriol, 2-ethyl-2-hydroxymethyl-propane diol, trimethylolpropane, alkoxlated triols, alkoxylated pentaerythritols, saccharides and sugar alcohols; (2) diols, such as ethylene glycol, diethylene glycol, triethylene glycol, propylene glycol, polyalkylene glycols having four or more alkylene oxide groups, 1,3-propane diol, 1,2-butane diol, 1,3-butane diol, 1,4-butane diol, 1,2-pentane diol, 1,5-pentanediol, 1,2-hexanediol, 1,6-hexane diol, 2-methyl-2,4-pentanediol, 1,2-heptane diol, 1,7-hexane diol, 2-ethyl-1,3-hexane diol, 1,2-octane diol, 2,2,4-trimethyl-1,3-pentane diol, 1,8-octane diol; and (3) thioglycol, or a mixture thereof. Typical aqueous-based ink compositions useful in the invention may contain 2-25 weight percent humectant(s), more preferably from about 6-20% humectant, most preferably from about 8-15% humectant.

The ink compositions of the present may also include, in addition to the humectant, a water miscible co-solvent or penetrant. Representative examples of co-solvents used in the aqueous-based ink compositions include: (1) alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; (2) lower mono- and di-alkyl ethers derived from the polyhydric alcohols such as ethylene glycol monomethyl ether, ethylene glycol monobutyl ether, ethylene glycol monoethyl ether acetate, diethylene glycol monomethyl ether, and diethylene glycol monobutyl ether acetate; and (3) nitrogen-containing compounds such as urea, 2-pyrrolidinone, N-methyl-2-pyrrolidinone, and 1,3-dimethyl-2-imidazolidinone; and (4) sulfur-containing compounds such as 2,2'-thiodiethanol, dimethyl sulfoxide, and tetramethylene sulfone. Typical aqueous-based ink compositions useful in the invention may contain 2-10 weight percent co-solvent(s).

Ink compositions of the present invention comprise at least one water-dispersible polyurethane\urea compound. "Water-dispersible" is defined herein to include individual polymer molecules or colloidal assemblies of polymer molecules, which are stably dispersed in the ink without the need for a dispersing agent. Water dispersible polyurethane\ureas employed in the present invention having at least a first soft segment formed from a polyol prepolymer and at least a second soft segment formed from a polyamine prepolymer, and may have the general Structure (I)

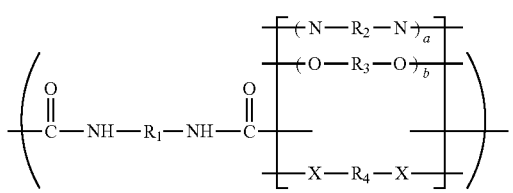

wherein; $R_1$ in the Structure (I) above is the central portion of the monomer unit that is the polymerization product of a diisocyanate; $R_2$ represents the central portion of a unit that is the polymerization product of at least one type of polyamine prepolymer; $R_3$ represents the central portion of a unit that is the polymerization product of at least one type of polyol prepolymer; $R_4$ is the central portion of a unit containing an acid group, where X can be the same or different and are —O— or —N— atom; and wherein among the total combined soft segments (a)+(b), polyamine prepolymers (a) that form urea bonds in the polyurethane/urea polymer is present in at least about 4 percent by weight.

$R_1$ is preferably a hydrocarbon group having a valence of two, more preferably containing a substituted or unsubstituted alicyclic, aliphatic, or aromatic group, preferably represented by one or more of the following structures:

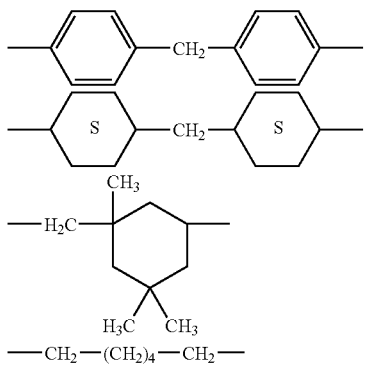

$R_2$ and $R_3$ preferably represents a soft segment comprising a prepolymer having a molecular weight above about 300 and below about 3000, and having ester, carbonate, or ether linkages.

The soft segments are introduced into the polyurethane backbone by using the prepolymers with both ends terminated with an amino(diamine) group or a hydroxyl(diol) group. The prepolymer having terminal hydroxyl groups is known as a polyol, and having terminal amine groups is known as a polyamine. When polyamines are used in the soft segment, urea bonds are formed in the polyurethane/urea, and when polyols are used in the soft segment, urethane bonds are formed in the polyurethane/urea.

Polyamines useful for the practice of the invention include those sold under the trade name JEFFAMINE® D, ED, and M series from Huntsman. Another more preferred polyether diamine is a polytetrahydrofuran bis(3-aminopropyl) terminated having a molecular weight of about 1,000. Polyols useful for the practice of the invention include: a) a polyester polyol obtained by, for example, esterification of a dicarboxylic acid with a diol, or ring opening reaction of a lactone (e.g. ε-caprolactone) and a diol; b) a polycarbonate polyol obtained, for example, by reacting a diol with diaryl carbonates or phosgene, and a polyether diol; c) a polyether polyol as a condensation product of, for example, ethylene glycol, propylene glycol, or tetramethylene glycol. Preferably the polyols have a molecular weight above about 300 and below about 3000.

$R_4$ is preferably the central portion of a monomeric unit containing a phosphoric acid, carboxylic acid, or sulfonic acid group, most preferably being carboxylic acids, such as 2,2'-bis(hydroxymethyl)propionic acid, 2,2'-bis(hydroxymethyl)butyric acid, and hydroxyethylether of 4,4'-bis(4-hydroxyphenyl)valeric acid. These materials may be prepared by any of the well known techniques in the art of polyurethane manufacture, for example, processes disclosed in U.S. Pat. No. 4,335,029 by Dadi, et al., assignee Witco Chemical Corporation (New York, N.Y.) and in "Aqueous Polyurethane Dispersions" by B. K. Kim, Colloid & Polymer Science, Vol. 274, No. 7 (1996) 599-611 © Steinopff Verlag 1996.

Water dispersible polyurethane\ureas employed in the present invention comprise soft segments formed from a combination of polyol prepolymer and polyamine prepolymer. While the addition of a polyamine prepolymer in the formation of a polyurethane/urea has been demonstrated to provide the advantages of the invention, it has also been observed that if too high a percentage (e.g., more than 50%) of the soft segment is formed by a polyamine, control of the polymerization process becomes difficult. Preferably, the polyurethane/ureas accordingly comprise combined soft segments that comprise between about 4% and about 50% polyamine prepolymer. Most preferably, the polyurethane/ureas comprise a soft segment that comprises between about 15% and about 50% polyamine prepolymer. Preferred polyurethanes of this invention have a sufficient amount of acid groups in the molecule to have an acid number from about 50 to about 150, more preferably from about 60 to 120 and most preferably from about 70 to 110. The acid number is defined as the milligrams of potassium hydroxide required to neutralize one gram of polymer. The acid number of the polymer may be calculated by the formula given in the following equation:

Acid number=(moles of acid monomer)*(56 grams/mole)*(1000)/(total grams of monomers)

where, moles of acid monomer is the total moles of all acid groups containing monomers that comprise the polymer, 56 is the formula weight for potassium hydroxide, and total grams of monomers is the summation of the weight of all the monomers, in grams, comprising the target polymer.

Polyurethane dispersions useful for the practice of the invention can be prepared by preparing a prepolymer having a relatively low molecular weight and a small excess of isocyanate groups and chain-extending with a chain extender the prepolymers into a high molecular weight polyurethane during the dispersion process. Such processes have been disclosed in, for example, U.S. Pat. No. 4,335,029 by Dadi, et al., assigned to Witco Chemical Corporation (New York, N.Y.); in "Aqueous Polyurethane Dispersions" by B. K. Kim, Colloid & Polymer Science, Vol. 274, No. 7 (1996) 599-611 © Steinopff Verlag 1996; and in "Polyurethane Dispersion Process" by Manea et al,. Paint and Coating Industry, January 2007, Page 30.

Preferred diamine chain extenders for the practice of the invention include ethylene diamine, diethylene triamine, propylene diamine, butylene diamine, hexamethylene diamine, cyclohexylene diamine, phenylene diamine, tolylene diamine, xylylene diamine, 3,3'-dinitrobenzidene, ethylene methylenebis(2-chloroaniline), 3,3'-dichloro-4,4'-biphenyl diamine, 2,6-diaminopyridine, 4,4'-diamino diphenylmethane, adducts of diethylene triamine with acrylate or its hydrolyzed products, hydrazine, and substituted hydrazines.

The polyurethane dispersions useful for the practice of this invention can also be prepared without involving the chain-extension step during the dispersion step. In the process the chemical reaction for forming urethane or urea linkages is completed prior to the dispersion step.

The polyurethane of this invention preferably has a minimum molecular weight of at least 8,000. Preferably, the polyurethane has a maximum molecular weight of 150,000. More preferably, the molecular weight of polyurethane is between about 10,000 and 100,000, and most preferably between about 15,000 and 60,000. The polyurethane dispersions useful for the practice of this invention preferably have a mean particle size of less than 100 nm and more preferably less than 50 nm.

The acid groups on the polyurethane and the acrylic polymer dispersants (when employed) are at least partially neutralized (converted into salts) using organic or inorganic bases, preferably monovalent inorganic bases, and most preferably aqueous alkaline metal hydroxides, selected from: potassium hydroxide, sodium hydroxide, rubidium hydroxide, or lithium hydroxide. In a preferred embodiment, at least 50 percent of the available acid groups on the polymer are converted into salts using a monovalent inorganic base, more preferably at least 70% and most preferably at least 85% of the available acid groups are converted. From a manufacturing perspective, preferably less than 100% of the acid groups are neutralized as this can lead to lack of control of the pH of the inks. Monovalent inorganic bases are highly preferred over organic bases such as amines as the neutralizing agents for the acrylic and polyurethane polymers since inks containing polymers neutralized with organic amines show very poor jetting performance in a thermal inkjet printhead.

In another preferred embodiment, the components of the ink composition are selected such that the ink viscosity is less than about 5.0 centapoise at 25 degrees Celsius, more preferably less than about 4.0, even more preferably less than 3.0 and most preferably less than 2. Ink compositions defined by these preferred embodiments are capable of achieving high firing frequencies with low variability for a large number of firing events. Many ingredients in an ink formulation can contribute to the viscosity of the final ink. One advantage of the polyurethane/ureas of the present invention is a reduced ink viscosity compared to non-urea containing polyurethanes. This offers the advantage of formulating with specific viscosity enhancing compounds which can improve density and image quality on selected image receivers.

Surfactants may be added to adjust the surface tension of the ink to an appropriate level. In a particular embodiment, relative dynamic and static surface tensions of various pigment based inks and colorless protective ink of an ink set may be controlled as described in copending, commonly assigned U.S. application Ser. No. 12/029,986, filed Feb. 12, 2008, the disclosure of which is incorporated by reference herein, to control intercolor bleed between the inks. In particular, where cyan, magenta, yellow, black, and colorless inks are employed, the surface tensions of the inks may have the relationships wherein (i) the dynamic surface tension at 10 milliseconds surface age for all inks of the ink set is greater than or equal to 35 mN/m, (ii) the static surface tensions of the yellow ink and of the colorless protective ink are at least 2.0 mN/m lower than the static surface tensions of the cyan, magenta, and black inks of the ink set, and (iii) the static surface tension of the colorless protective ink is at least 1.0 mN/m lower than the static surface tension of the yellow ink.

The surfactants may be anionic, cationic, amphoteric, or nonionic and used at levels of 0.01 to 5% of the ink composition. Examples of suitable nonionic surfactants include, linear or secondary alcohol ethoxylates (such as the TERGITOL® 15-S and TERGITOL® TMN series available from Union Carbide and the BRIJ® series from Uniquema), ethoxylated alkyl phenols (such as the TRITON® series from Union Carbide), fluoro surfactants (such as the ZONYLS® from DuPont; and the FLUORADS® from 3M), fatty acid ethoxylates, fatty amide ethoxylates, ethoxylated and propoxylated block copolymers (such as the PLURONIC® and TETRONIC® series from BASF), ethoxylated and propoxylated silicone based surfactants (such as the SILWET® series from CK Witco), alkyl polyglycosides (such as the GLUCOPONS® from Cognis), and acetylenic polyethylene oxide surfactants (such as the Surfynols from Air Products).

Examples of anionic surfactants include: carboxylated (such as ether carboxylates and sulfosuccinates), sulfated (such as sodium dodecyl sulfate), sulfonated (such as dodecyl benzene sulfonate, alpha olefin sulfonates, alkyl diphenyl oxide disulfonates, fatty acid taurates, and alkyl naphthalene sulfonates), phosphated (such as phosphated esters of alkyl and aryl alcohols, including the STRODEX® series from Dexter Chemical), phosphonated and amine oxide surfactants, and anionic fluorinated surfactants. Examples of amphoteric surfactants include betaines, sultaines, and aminopropionates. Examples of cationic surfactants include quaternary ammonium compounds, cationic amine oxides, ethoxylated fatty amines, and imidazoline surfactants. Additional examples of the above surfactants are described in "McCutcheon's Emulsifiers and Detergents: 1995, North American Editor."

A biocide (0.01-1.0% by weight) may also be added to prevent unwanted microbial growth which may occur in the ink over time. A preferred biocide for the inks employed in the present invention is PROXEL® GXL (Zeneca Colours Co.) at a concentration of 0.05-0.1% by weight or KORDEK® (Rohm and Haas Co.) at a concentration of 0.05-0.1% by weight (based on 100% active ingredient). Additional additives which may optionally be present in an inkjet ink composition include thickeners, conductivity enhancing agents, anti-kogation agents, drying agents, waterfast agents, dye solubilizers, chelating agents, binders, light stabilizers, viscosifiers, buffering agents, anti-mold agents, anti-curl agents, stabilizers, and defoamers.

The pH of the aqueous ink compositions of the invention may be adjusted by the addition of organic or inorganic acids or bases. Inorganic bases are preferred, however small amounts of organic bases, such as triethanolamine, may be used to adjust the pH of the ink. Useful inks may have a preferred pH of from about 4 to 10, depending upon the type of pigment being used. Preferably, the pH of the present ink is from 6 to 9, more preferably from 7.5 to 8.5.

The inks of the present invention can be printed through an inkjet printhead capable of achieving firing frequencies of at least 12 kHz with a near nozzle velocity of at least 10 meters/second. Any of the known printhead designs in the art of inkjet printing may be used which are capable of achieving these high speed firing frequencies. Preferably, the inkjet printer is equipped with a thermal inkjet printhead. Particularly preferred printhead designs are disclosed in US Publication Numbers 2006/0103691 and 2008/0136867, the disclosures of which are incorporated by reference herein.

Inks of the present invention may be applied to a photoglossy or plain paper receiver. The two types of receivers are distinguished from one another in that the photoglossy receiver is manufactured with a coated layer above the underlying paper support. Examples of plain papers include: Kodak Bright White inkjet paper; Hewlett Packard Color inkjet paper; Xerox Extra Bright white inkjet paper; Georgia-Pacific inkjet Paper Catalog Number 999013; Staples inkjet paper; International Paper Great White MultiUse 20 Paper; Xerox Premium Multipurpose Paper; Hammermill Copy plus or ForeMP paper; and Hewlett Packard Multipurpose paper. The plain papers may include papers that have been treated with multivalent salts during or after manufacture of the paper.

Inks of the present invention can be printed as digital images having photographic quality if a suitable recording medium, such as glossy inkjet paper, is used. Photoglossy receivers may be further categorized as being a swellable media (having a non-porous polymer coating) or a microporous media, although hybrid designs are also well known. The microporous media are typically comprised of water-absorbing fine particles or powders mixed with a polymeric hydrophilic binder to form a microporous structured coating. The hydrophilic particles or powders are typically polycrystalline inorganic materials such as boehmite alumina, porous and non-porous silicas (for example Sylojet or Ludox particles), or amorphous inorganic materials such as aluminum silicates. Microporous photoglossy media are preferred due to their relatively quick drying capabilities and improved water-fastness and smudge resistance compared to swellable media. The design of both the plain paper and photoglossy media vary widely depending on materials and paper manufacturing processes and should not be construed to limit the scope of the present invention.

The following examples illustrate, but do not limit, the utility of the present invention.

EXAMPLES

Polyurethane Dispersions Used in the Ink Examples

Polyurethane dispersions shown in the ink examples below typically have particle sizes in the range from about 10 to about 40 nanometers in diameter. These sizes may change depending on the specific aqueous environment of the ink formulations. Unless otherwise stated, the polyurethane dispersions are prepared by carrying out the polymerization reaction in either tetrahydrofuran (THF) or ethyl acetate using isophorone diisocyante, 2,2-bis(hydroxymethyl) propionic acid, and a polyol or polyamine, neutralizing the resultant polymer with aqueous potassium hydroxide solution, diluting with additional deionized water if necessary, and removing volatile solvent by vacuum evaporation or stripping.

Polyurethane PU-1: An 85 acid number polyurethane made with isophorone diisocyanate, 2,2-bis(hydroxymethyl) propionic acid (DMPA), and the remainder as 100% of a 2000 Mw polytetrahydrofuran polyol. 95% of the acid groups are neutralized with potassium hydroxide. The isocyanate to hydroxyl ratio was adjusted to obtain a Mw of 26,600.

Polyurethane PU-2: An 85 acid number polyurethane made with isophorone diisocyanate, 2,2-bis(hydroxymethyl) propionic acid (DMPA), and the remainder as 100% of a 2000 Mw polytetrahydrofuran polyol. 95% of the acid groups are neutralized with potassium hydroxide. The isocyanate to hydroxyl ratio was adjusted to obtain a Mw of 28,600.

Polyurethane PU-3: A 100 acid number polyurethane made with isophorone diisocyanate, 2,2-bis(hydroxymethyl) propionic acid (DMPA), and the remainder as 100% of a 1000 Mw polytetrahydrofuran polyol. 95% of the acid groups are neutralized with potassium hydroxide. The isocyanate to hydroxyl ratio was adjusted to obtain a Mw of 37,000.

Polyurethane PU-4: An 85 acid number polyurethane made with isophorone diisocyanate, 2,2-bis(hydroxymethyl) propionic acid (DMPA), and the remainder as 100% of a 2000 Mw polytetrahydrofuran polyol. 95% of the acid groups are neutralized with potassium hydroxide. The isocyanate to hydroxyl ratio was adjusted to obtain a Mw of 39,800.

Polyurethane PU-5: An 85 acid number polyurethane made with isophorone diisocyanate, 2,2-bis(hydroxymethyl) propionic acid (DMPA), and 100% of a 2000 Mw polytetrahydrofuran polyol. 100% of the acid groups are neutralized with potassium hydroxide. The isocyanate to hydroxyl ratio was adjusted to obtain a Mw of 40,500.

Polyurethane PU-6: A 100 acid number polyurethane made with isophorone diisocyanate, 2,2-bis(hydroxymethyl) propionic acid (DMPA), and 100% of a 2000 Mw polytetrahydrofuran polyol. 95% of the acid groups are neutralized with potassium hydroxide. The isocyanate to hydroxyl ratio was adjusted to obtain a Mw of 45,300.

Polyurethane PU-7: An 85 acid number polyurethane made with isophorone diisocyanate, 2,2-bis(hydroxylmethyl) propionic acid (DMPA), and the remainder a mixture of 4.85% of a 1100 Mw aminopropyl-terminated polytetrahydrofuran and 95.15% of a 2000 Mw polytetrahydrofuran polyol. 100% of the acid groups are neutralized with potassium hydroxide. The isocyanate to hydroxyl ratio was adjusted to obtain a Mw of 26,200.

Polyurethane PU-8: An 85 acid number polyurethane made with isophorone diisocyanate, 2,2-bis(hydroxylmethyl) propionic acid (DMPA), and the remainder a mixture of 14.8% of a 1100 Mw aminopropyl-terminated polytetrahydrofuran and 85.2% of a 2000 Mw polytetrahydrofuran polyol. 100% of the acid groups are neutralized with potassium hydroxide. The isocyanate to hydroxyl ratio was adjusted to obtain a Mw of 27,800.

Polyurethane PU-9: An 85 acid number polyurethane made with isophorone diisocyanate, 2,2-bis(hydroxylmethyl) propionic acid (DMPA), 22% of a 1100 Mw aminopropyl-terminated polytetrahydrofuran, and the remainder a 2000 Mw polytetrahydrofuran polyol. 100% of the acid groups are neutralized with potassium hydroxide. The isocyanate to hydroxyl ratio was adjusted to obtain a Mw of 28,700.

Polyurethane PU-10: An 85 acid number polyurethane made with isophorone diisocyanate, 2,2-bis(hydroxylmethyl) propionic acid (DMPA), and the remainder a mixture of 22% of a 1100 Mw aminopropyl-terminated polytetrahydrofuran and 78% of a 2000 Mw polytetrahydrofuran polyol. 100% of the acid groups are neutralized with potassium hydroxide. The isocyanate to hydroxyl ratio was adjusted to obtain a Mw of 32,500.

Polyurethane PU-11: A 100 acid number polyurethane made with isophorone diisocyanate, 2,2-bis(hydroxylmethyl) propionic acid (DMPA), and the remainder a mixture of 33% of a 1100 Mw aminopropyl-terminated polytetrahydrofuran and 67% of a 2000 Mw polytetrahydrofuran polyol. 100% of the acid groups are neutralized with potassium hydroxide. The isocyanate to hydroxyl ratio was adjusted to obtain a Mw of 36,100.

Polyurethane PU-12: An 85 acid number polyurethane made with isophorone diisocyanate, 2,2-bis(hydroxylmethyl) propionic acid (DMPA), and the remainder a mixture of 34% of a 1100 Mw aminopropyl-terminated polytetrahydrofuran and 66% of a 2000 Mw polytetrahydrofuran polyol. 100% of the acid groups are neutralized with potassium hydroxide. The isocyanate to hydroxyl ratio was adjusted to obtain a Mw of 54,600.

Polyurethane PU-13: An 85 acid number polyurethane made with isophorone diisocyanate, 2,2-bis(hydroxylmethyl) propionic acid (DMPA), and the remainder a mixture of 22% of a 1100 Mw aminopropyl-terminated polytetrahydrofuran and 78% of a 2000 Mw polytetrahydrofuran polyol. 100% of the acid groups are neutralized with potassium hydroxide. The isocyanate to hydroxyl ratio was adjusted to obtain a Mw of 58,800.

Polyurethane PU-14: A 100 acid number polyurethane made with isophorone diisocyanate, 2,2-bis(hydroxylmethyl) propionic acid (DMPA), and the remainder a mixture of 50% of a 1100 Mw aminopropyl-terminated polytetrahydrofuran and 50% of a 2000 Mw polytetrahydrofuran polyol. 100% of the acid groups are neutralized with potassium hydroxide. The isocyanate to hydroxyl ratio was adjusted to obtain a Mw of 86,000.

Preparation of Pigment Dispersions

An aqueous pigment dispersion was prepared using a high speed mill equipped with polymeric milling media having a diameter of 50 microns until the median size of the pigment particles was below 50 nm.

M-1: A dispersion of magenta pigment CIBA CROMOPHTAL® Jet Magenta PR2BC (Ciba Specialty Chemicals) dispersed with a copolymer of benzylmethacrylate, stearylmethacrylate, and methacrylic acid in a monomer weight ratio of 37/30/33 having a weight average molecular weight of 9030 as determined by the Size Exclusion Chromatography. The polymer is neutralized with potassium hydroxide to have a degree of neutralization of about 85%.

Preparation of Inks

A series of magenta pigment inks were prepared according to the following descriptions:

Pigment Ink-1

Into an approximately 150 ml high density polyethylene bottle with magnetic stirring, the following components were added in order: 61.17 g of high purity water, 0.26 g of a 9.5 wt % solution of the biocide Kordek MLX, 3.75 g of glycerol, 5.0 g of 2-pyrrolidinone, 2.5 g of 1-(2-hydroxyethyl)-2-pyrrolidinone, 0.13 g of the surfactant STRODEX® PK90 (Dexter Chemical), 5.19 g of a 28.9 wt % solution of polyurethane PU-1, and 43.19 g of the PR2BC magenta pigment dispersion M-1 containing 10.13 wt % pigment, and. 0.06 g of 1N potassium hydroxide was added to adjust the pH. The resulting 125 g of ink was stirred for at least an hour and filtered with a 1.0 um disk filter.

Pigment Inks Ink-2 through Ink-14

Pigment inks Ink-2 through Ink-14 were prepared according the procedure outlined in pigment Ink-1 except that the polyurethane binder was changed as identified in Table 1. In each case, the weight percent polyurethane binder was maintained at 1.2% based on the total of the ink components.

Colorless Ink, Ink-15

Into an approximately 150 ml high density polyethylene bottle with magnetic stirring, the following components were added in order: 83.47 g of high purity water, 0.26 g of a 9.5 wt % solution of the biocide Kordek MLX, 15.0 g of glycerol, 7.5 g of ethylene glycol, 2.5 g of 1,2-pentanediol, 10.5 g of a 28.58 wt % solution of polyurethane PU-1, 4.17 g of a benzylmethacrylate/methacrylic acid copolymer having a monomer weight ratio of 67/33, 0.94 g of TERGITOL® 15-S-5 surfactant, and 0.67 g of 1N potassium hydroxide was added to adjust the pH. The resulting 125 g of ink was stirred for at least an hour and filtered with a 1.0 um disk filter.

Colorless Inks Ink-16 and Ink-17

Colorless inks Ink-16 and Ink-17 were prepared according to the procedure outlined in Ink-15 except the polyurethane binder PU-1 was replaced according to Table 1. In each case, the weight percent polyurethane binder in the colorless ink was maintained at 2.4% based on the total of the ink components.

Ink Performance Results

The latency jetting performance of inks Ink-1 through Ink-17 was evaluated by loading each ink directly into a thermal printhead equipped with 3 pL and 6 pL nozzles. The colored inks were fired through the 3 pL nozzles while the colorless inks were fired through the 6 pL nozzles. At a voltage of 12% above the threshold voltage for the ink to begin firing, the transit time for each drop to travel 0.3 mm from the nozzle plate was measured for the $15^{th}$ and the $50^{th}$ ejection pulse firing at 2 kHz after the nozzle was allowed to sit uncapped under ambient room conditions for 50, 75, 100, 200, and 500 seconds. Each of the inks had a useful initial jetting velocity versus firing frequency relationship such that the inks achieved a near nozzle velocity of at least 10 meters/sec at a firing frequency of 12 kHz. An overall jetting latency metric was then defined as the average of the ten jetting velocities at the two ejection pulses and five de-cap times. The higher the number for the jetting latency metric, the better overall latency performance. For example, an excellent performing ink would fire a drop at a high velocity after wait times up to 500 sec with the fewest number of pulses required to obtain a drop. A poor performing ink would fail to eject a drop at less than a 500 sec wait time even after 50 ejection pulses of the nozzle.

TABLE 1

Jetting Latency Performance Data

| Ink | Colorant | Polyurethane | Polyurethane Mw | Polyurethane Acid number | Wt % urea forming soft segment | Ink viscosity | Jetting latency metric |
| --- | --- | --- | --- | --- | --- | --- | --- |
| I-1 comp | Magenta Pigment | PU-1 | 26.6 | 85 | 0 | 1.94 | 9.7 |
| I-2 comp | Magenta Pigment | PU-2 | 28.6 | 85 | 0 | 1.89 | 6.1 |
| I-3 comp | Magenta Pigment | PU-3 | 37.0 | 100 | 0 | 2.07 | 3.2 |
| I-4 comp | Magenta Pigment | PU-4 | 39.8 | 85 | 0 | 2.02 | 6.3 |
| I-5 comp | Magenta Pigment | PU-5 | 40.5 | 85 | 0 | 1.92 | 1.4 |

TABLE 1-continued

Jetting Latency Performance Data

| Ink | Colorant | Poly-urethane | Poly-urethane Mw | Poly-urethane Acid number | Wt % urea forming soft segment | Ink viscosity | Jetting latency metric |
|---|---|---|---|---|---|---|---|
| I-6 comp | Magenta Pigment | PU-6 | 45.3 | 100 | 0 | 2.26 | 0 |
| I-7 inv | Magenta Pigment | PU-7 | 26.2 | 85 | 4.85 | 1.80 | 17.2 |
| I-8 inv | Magenta Pigment | PU-8 | 27.8 | 85 | 14.8 | 1.77 | 17.2 |
| I-9 inv | Magenta Pigment | PU-9 | 28.7 | 85 | 22 | 1.88 | 12.2 |
| I-10 inv | Magenta Pigment | PU-10 | 32.5 | 100 | 22 | 1.93 | 14.3 |
| I-11 inv | Magenta Pigment | PU-11 | 36.1 | 100 | 33 | 1.86 | 12.4 |
| I-12 inv | Magenta Pigment | PU-12 | 54.6 | 85 | 34 | 1.80 | 6.0 |
| I-13 inv | Magenta Pigment | PU-13 | 58.8 | 85 | 22 | 1.87 | 5.7 |
| I-14 inv | Magenta Pigment | PU-14 | 86.0 | 100 | 50 | 1.91 | 5.7 |
| I-15 comp | Colorless | PU-1 | 26.6 | 85 | 0 | 2.09 | 16.8 |
| I-16 comp | Colorless | PU-4 | 39.8 | 85 | 0 | 2.23 | 3.2 |
| I-17 inv | Colorless | PU-9 | 28.7 | 85 | 22 | 1.94 | 20.2 |

A comparison of the jetting latency metric in Table 1 shows that inks prepared with polyurethanes containing a urea bond forming a soft segment of the polyurethane show consistently superior jetting latency when compared to inks prepared with similar molecular weight polyurethanes that contain no intentional urea linkages. This is true for both the pigment-based and colorless ink formulations.

A further advantage of inks made with polyurethanes containing soft segments comprising urea linkages is a reduction in ink viscosity. In many thermal inkjet-printing systems the ink viscosity must be maintained below about 3 centapoise for optimal firing performance. Inks formulated with polyurethanes of the present invention show reduced viscosities at a given molecular weight when compared to similar molecular weight polyurethanes made without urea linkages. For example, the ink viscosities for the non-urea polyurethanes (Inks 1 through 6) tend to increase with the molecular weight of the polymer. However, ink viscosities for the urea-based polyurethanes (Inks I-7 through I-14) increase much less in viscosity as a function of molecular weight of the polymer.

The invention has been described with reference to a preferred embodiment. However, it will be appreciated that variations and modifications can be affected by a person of ordinary skill in the art without departing from the scope of the invention.

The invention claimed is:

1. An inkjet ink composition comprising:
   (A) water; and
   (B) at least one water-dispersible polyurethane/urea polymer having at least a first soft segment formed from a polyol prepolymer and at least a second soft segment formed from a polyamine prepolymer, wherein the polyol prepolymer forms urethane bonds in the polyurethane/urea and the polyamine prepolymer forms urea bonds in the polyurethane/urea, and further wherein at least about 4% by weight of the combined soft segments is formed by polyamine prepolymers that form urea bonds in the polyurethane/urea polymer, and
   (C) a pigment;
   wherein the first and second soft segments are formed from prepolymers having ester, carbonate, or ether linkages and having molecular weights above about 300 and below about 3000, the polyurethane/urea polymer has an acid number between 50 and 150, and the viscositly of the ink is less than 3.0 centipoise at 25 degrees Celsius.

2. The ink composition of claim 1, wherein between 15% and 50% by weight of the combined soft segments is formed by polyamine prepolymers that form urea bonds in the polyurethane/urea polymer.

3. The ink composition of claim 1, further comprising at least one humectant.

4. The ink composition of claim 3, wherein the at least one humectant comprises a polyhydric alcohol or a nitrogen containing organic compound.

5. The ink composition of claim 1, wherein the at least one polyurethane/urea polymer has a weight average molecular weight of at least 8,000.

6. The ink composition of claim 1, wherein the at least one polyurethane/urea polymer has a weight average molecular weight between about 10,000 and 100,000.

7. The ink composition of claim 1, wherein the at least one polyurethane/urea polymer has a weight average molecular weight between about 10,000 and 100,000.

8. The ink composition of claim 1, wherein the at least one polyurethane/urea polymer has a weight average molecular weight between about 15,000 and 60,000.

9. The ink composition of claim 1, wherein the prepolymer soft segments comprise polyether segments.

10. The ink composition of claim 1, wherein the pigment is dispersed with a polymeric dispersant.

11. The ink composition of claim 1, wherein the polyurethane/urea polymer is neutralized with a monovalent inorganic base selected from potassium hydroxide, sodium hydroxide, lithium hydroxide, or rubidium hydroxide.

12. An ink set comprising two or more colored ink compositions each according to claim 1, wherein at least two of the ink compositions comprise different pigments.

13. An ink set of claim 12 further comprising at least one colorless ink comprising water and at least one water-dispersible polyurethane/urea polymer having at least a first soft segment formed from a polyol prepolymer and at least a second soft segment formed from a polyamine prepolymer, wherein the polyol prepolymer forms urea bonds in the polyurethane/urea and the polyamine prepolymer forms urea bonds in the polyurethane/urea, and further wherein at least about 4% by weight of the combined soft segments is formed by polyamine prepolymers that form urea bonds in the polyurethane/urea polymer.

14. A process of forming an image comprising jetting the inkjet ink of claim 1 onto a media.

* * * * *